United States Patent
Park

(10) Patent No.: US 10,959,096 B2
(45) Date of Patent: Mar. 23, 2021

(54) DATA COMMUNICATION METHOD FOR WIRELESS POWER CHARGING AND ELECTRONIC DEVICE USING THE SAME

(71) Applicant: SAMSUNG ELECTRONICS CO., LTD., Suwon-si (KR)

(72) Inventor: Seho Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 16/032,375

(22) Filed: Jul. 11, 2018

(65) Prior Publication Data

US 2019/0021001 A1 Jan. 17, 2019

(30) Foreign Application Priority Data

Jul. 11, 2017 (KR) .................. 10-2017-0088082

(51) Int. Cl.
| | |
|---|---|
| *H04W 12/06* | (2009.01) |
| *H02J 50/70* | (2016.01) |
| *H02J 50/80* | (2016.01) |
| *H02J 7/02* | (2016.01) |
| *H04L 29/06* | (2006.01) |

(Continued)

(52) U.S. Cl.
CPC ............ *H04W 12/06* (2013.01); *H02J 7/025* (2013.01); *H02J 50/10* (2016.02); *H02J 50/70* (2016.02); *H02J 50/80* (2016.02); *H04L 63/08* (2013.01); *H04L 63/0823* (2013.01); *H02J 7/00045* (2020.01)

(58) Field of Classification Search
CPC .. H02J 50/10; H02J 50/70; H02J 50/80; H02J 7/00045; H02J 7/025; H04L 63/08; H04L 63/0823; H04W 12/06

USPC ............................................................ 726/4
See application file for complete search history.

(56) References Cited

U.S. PATENT DOCUMENTS

| | | |
|---|---|---|
| 6,631,130 B1 | 10/2003 | Roy et al. |
| 6,636,515 B1 | 10/2003 | Roy et al. |
| 6,751,214 B1 | 6/2004 | Parruck et al. |

(Continued)

FOREIGN PATENT DOCUMENTS

| | | |
|---|---|---|
| KR | 2002-0053316 | 7/2002 |
| KR | 10-2014-0082628 A | 7/2014 |
| WO | 2015156477 A1 | 10/2015 |

OTHER PUBLICATIONS

Voitovych, "The Authentication Method in Wireless Sensor Network Based on Trust Model", 2017 IEEE First Ukraine Conference on Electrical and Computer Engineering (UKRCON) (Year: 2017).*

(Continued)

*Primary Examiner* — Khalil Naghdali
(74) *Attorney, Agent, or Firm* — Nixon & Vanderhye P.C.

(57) ABSTRACT

A data communication method for wireless power charging and an electronic device using the same is provided. An electronic device performing authentication for wirelessly receiving power supplied from an external electronic device includes a wireless charging receiver module and a processor configured to control the wireless charging receiver module to exchange authentication data with the external electronic device and receive the wireless power supplied from the external electronic device based on a result of the authentication, the authentication data being split into at least one packet. Other embodiments are possible.

20 Claims, 10 Drawing Sheets

(51) Int. Cl.
  *H02J 50/10* (2016.01)
  *H02J 7/00* (2006.01)

(56) References Cited

U.S. PATENT DOCUMENTS

| | | | |
|---|---|---|---|
| 7,061,935 | B1 | 6/2006 | Roy et al. |
| 7,774,484 | B1 | 8/2010 | Masters et al. |
| 8,130,958 | B2 | 3/2012 | Schrum, Jr. et al. |
| 10,250,077 | B2* | 4/2019 | Park ................ H02J 50/40 |
| 2002/0177910 | A1 | 11/2002 | Quarterman et al. |
| 2003/0128140 | A1 | 7/2003 | Xie et al. |
| 2005/0076390 | A1 | 4/2005 | Klausberger et al. |
| 2005/0183120 | A1 | 8/2005 | Jain et al. |
| 2005/0265349 | A1 | 12/2005 | Garg et al. |
| 2006/0259845 | A1 | 11/2006 | Baek |
| 2008/0101357 | A1 | 5/2008 | Iovanna et al. |
| 2008/0126559 | A1 | 5/2008 | Elzur et al. |
| 2011/0279226 | A1 | 11/2011 | Chen et al. |
| 2012/0198032 | A1 | 8/2012 | Fitzgerald et al. |
| 2013/0128757 | A1* | 5/2013 | Chowdhary ......... H04W 24/00 370/252 |
| 2014/0325218 | A1* | 10/2014 | Shimizu ................ H04W 4/24 713/168 |
| 2015/0006395 | A1 | 1/2015 | Chu |
| 2015/0046646 | A1 | 2/2015 | Elzind |
| 2015/0073591 | A1 | 3/2015 | Falk et al. |
| 2015/0102680 | A1* | 4/2015 | Menegoli ............. H02J 50/15 307/104 |
| 2015/0127911 | A1 | 5/2015 | Steiss |
| 2016/0094083 | A1 | 3/2016 | Park et al. |
| 2016/0100311 | A1 | 4/2016 | Kumar |
| 2016/0170890 | A1 | 6/2016 | Steiss |
| 2016/0233728 | A1 | 8/2016 | Park et al. |
| 2017/0026405 | A1 | 1/2017 | Vengalil et al. |
| 2017/0061142 | A1* | 3/2017 | Niessen ............... G06F 21/604 |
| 2017/0099332 | A1 | 4/2017 | Bullotta et al. |
| 2017/0110910 | A1* | 4/2017 | Zeine ..................... H02J 50/80 |
| 2017/0201130 | A1 | 7/2017 | Park |

OTHER PUBLICATIONS

Texas Instruments, "Integrated Wireless Power Supply Receiver, Qi (Wireless Power Consortium) Compliant," bq51013A, bq51014, Oct. 2013, see pp. 17-18, 26 and figure 38, 47 pp. total.
International Search Report dated Oct. 8, 2018 issued in PCT International Patent Application No. PCT/KR2018/007856, 3 pp.
European Search Report dated Apr. 24, 2020 for EP Application No. 18832196.2.

* cited by examiner

DATA COMMUNICATION METHOD FOR WIRELESS POWER CHARGING AND ELECTRONIC DEVICE USING THE SAME

CROSS-REFERENCE TO RELATED APPLICATION

This application is based on and claims priority under 35 U.S.C. § 119 to Korean Patent Application No. 10-2017-0088082, filed on Jul. 11, 2017, in the Korean Intellectual Property Office, the disclosure of which is incorporated by reference herein in its entirety.

TECHNICAL FIELD

The present disclosure relates to a data communication method for wireless power charging and/or an electronic device using the same.

BACKGROUND

Recently, wireless charging technologies based on electromagnetic induction or magnetic resonance are being popularized as an option for electronic devices such as a smartphone. A wireless charging technology is designed such that, if a power receiver (PRX, e.g., smartphone) contacts a power transmitter (PTX, e.g., wireless charging pad) or the PRX is placed within a certain range from the PRX, the battery of the PRX is charged via electromagnetic induction or electromagnetic resonance.

SUMMARY

For a wireless charging operation between a PTX and a PRX, it may be necessary to perform an authentication procedure for PTX or PRX authentication. In this case, if authentication fails between the PTX and PRX, this may cause battery overcharge or insufficient charging, resulting in damage of the electric device and user inconvenience. In the conventional wireless charging systems, however, the data communication between the PTX and PRX for wireless charging is performed at a data rate of about 2 kbps, which may be insufficient for exchanging data necessary for device authentication efficiently in a short time.

In accordance with an example aspect of the present disclosure, an electronic device for performing authentication for wirelessly receiving power supplied from an external electronic device is provided. The electronic device includes a wireless charging receiver module including wireless charging receiver circuitry, and a processor configured to control the wireless charging receiver module to exchange authentication data with the external electronic device and receive the wireless power supplied from the external electronic device based on a result of the authentication, the authentication data being split into at least one packet.

In accordance with another example aspect of the present disclosure, an electronic device performing authentication for wirelessly supplying power to an external electronic device is provided. The electronic device includes a wireless charging transmitter module including wireless charging transmitter circuitry, and a processor configured to control the wireless charging transmitter module to exchange standard authentication data with the external electronic device and wirelessly supply power to the external electronic device based on a result of the authentication, the authentication data being split into at least one packet.

In accordance with another example aspect of the present disclosure, an electronic device for wirelessly receiving power from an external electronic device is provided. The electronic device includes a wireless charging receiver module including wireless charging receiver circuitry, and a processor configured to control the wireless charging receiver module to exchange first data for authentication with the external electronic device and encrypted second data for authentication with the external electronic device and receive the power supplied by the external electronic device.

In accordance with another example aspect of the present disclosure, an electronic device for wirelessly supplying power to an external electronic device is provided. The electronic device includes a wireless charging transmitter module including wireless charging transmitter circuitry, and a processor configured to control the wireless charging transmitter module to perform communication with the external electronic device for exchange of first data for authentication, perform communication with the external device for exchange of encrypted second data, and supply the power to the external electronic device.

BRIEF DESCRIPTION OF THE DRAWINGS

The above and other aspects features and advantages of certain embodiments of the present disclosure will be apparent from the following detailed description, taken in conjunction with the accompanying drawings, in which.

DETAILED DESCRIPTION

Figure 1:
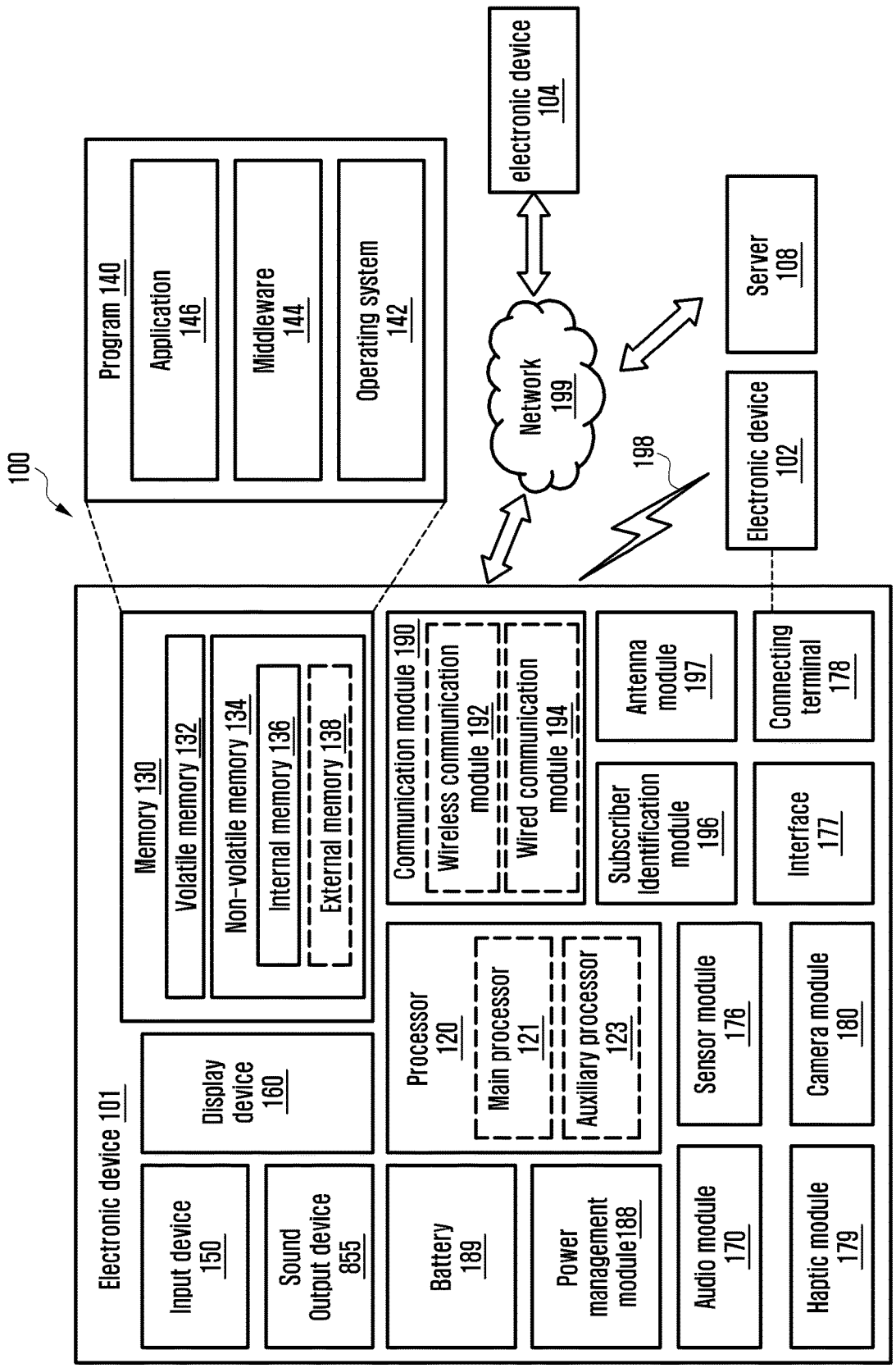
FIG. 1 is a block diagram illustrating an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an example embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an example embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an example embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an example embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an example embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an example embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an example embodiment, the haptic module 179 may include, for example, a motor, a piezoelectric element, or an electric stimulator.

The camera module 180 may capture a still image or moving images. According to an example embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an example embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an example embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an example embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other example aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
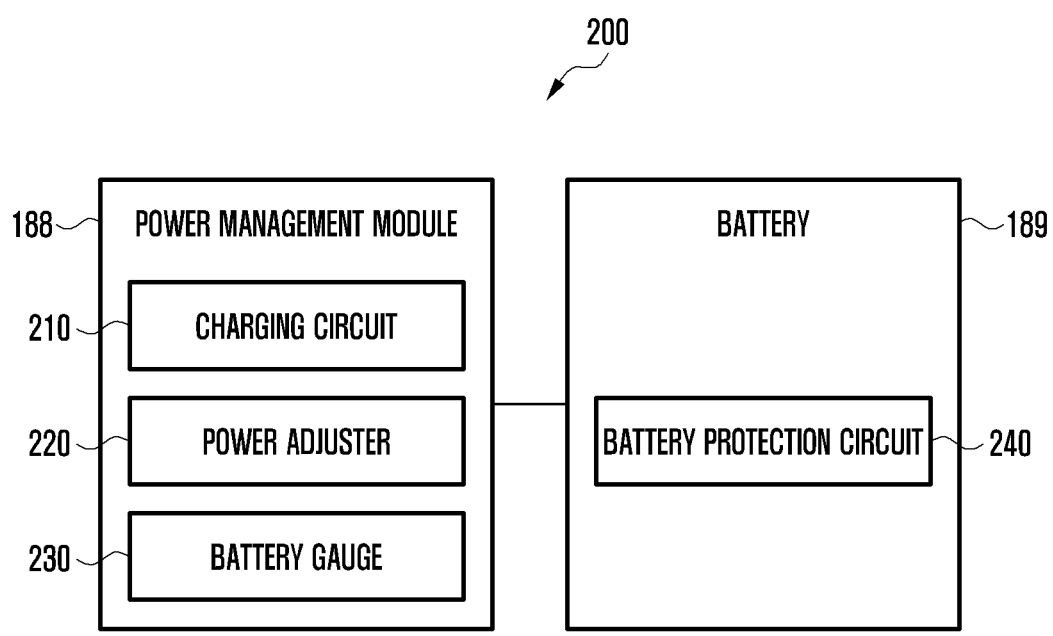
FIG. 2 is a block diagram illustrating configurations of the power management module and the battery according to various embodiments of the present disclosure.

FIG. 2 is a block diagram illustrating configurations of the power management module 188 and the battery 189 according to various embodiments of the present disclosure. As shown in FIG. 2, the power management module 188 may include a charging circuit 210, a power adjuster 220, and a battery gauge 230. The charging circuit 210 may charge the battery 189 with the power supplied from a power source outside the electronic device 101. According to an example embodiment of the present disclosure, the charging circuit 210 may select a charging mode (e.g., normal charging mode and fast charging mode) according to at least one of a type of the external power source (e.g., power source adaptor, universal serial bus (USB), and wireless charging), available power supply level from the power source (e.g., equal to or higher than 20 watt), and characteristic of the battery 189 and charge the battery 189 in the selected charging mode. The power management module 188 may be connected to the external power source via a power cord, the connection terminal 178, or the wireless charging module 197 (including wireless charging circuitry).

The power adjuster 220 may adjust the voltage level or the current level of the power supplied from the external power source of the battery 189 to generate power as different voltage levels or different current levels. The power adjuster 220 may adjust the power supplied from the external power source or the battery 189 in voltage or current level to be fit for the components constituting the electronic device 101. According to an example embodiment of the present disclosure, the power adjuster 220 may be implemented in the form of a low dropout (LDO) regulator or a switching regulator.

The battery gauge 230 may measure the state of charge of the battery 189 to provide battery utilization state information (e.g., battery capacity, number of charge/discharge cycles, voltage, and temperature).

The power management module 188 may judge a charging state (e.g., lifespan, overvoltage, under-voltage, overcurrent, overcharge, over-discharge, overheat, short circuit, and swelling) based on at least part of the battery utilization state information collected by means of the charging circuit 210, power adjuster 220, and battery gauge 230; determine whether the battery 189 is in a normal state or an abnormal state based on at least part of the charging state information; and control, if it is determined that the battery 189 is in the abnormal state, the charging of the battery 189 (e.g., reducing charging current or voltage and stopping the charging operation). According to an example embodiment of the present disclosure, at least part of the functionality of the power management module 188 may be performed by an external control device (e.g., processor 120).

According to an example embodiment of the present disclosure, the battery 189 may include a battery protection circuit (protection circuitry module (PCM)) 240. The battery protection circuit 240 may be equipped with various functions (e.g., pre-cutoff function) for protecting against performance degradation and damage of the battery 189. Additionally or alternatively, the battery protection circuit 240 may be implemented as at least part of a battery management system (BMS) that is responsible for cell balancing, battery capacity measurement, charge/discharge cycles measurement, temperature measurement, and voltage measurement.

According to an example embodiment of the present disclosure, at least part of the battery utilization state or the charging state information of the battery 189 may be collected by means of the battery gauge 230, the power management module 188, and corresponding sensors (e.g., temperature sensor) of the sensor module 176. According to an example embodiment of the present disclosure, the corresponding sensors (e.g., temperature sensor) of the sensor module 176 may be implemented as part of the battery protection circuit 140 and arranged close to the battery 189 as a separate device.

The above enumerated components of the electronic device of the present disclosure may be implemented with one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

According to various embodiments of the present disclosure, the electronic device may be any of various types of devices. Examples of the electronic device may include at least one of a portable communication device (e.g., smartphone), a computing device, a portable multimedia device, a portable medical device, a camera, a wearable device, or an electronic appliance device. However, the electronic device of the present disclosure is not limited to the aforementioned electronic devices.

Various embodiments of the present disclosure are described in detail with reference to accompanying drawings. The embodiments and terms used therein are not intended to limit the disclosure but to help understand the present disclosure, and it should be understood that the embodiments include all changes, equivalents, and/or substitutes within the spirit and scope of the disclosure. The same reference numbers are used throughout the drawings to refer to the same or like parts. As used herein, the singular forms "a", "an" and "the" are intended to include the plural forms as well, unless the context clearly indicates otherwise. As used herein, terms such as "first," "second," etc. are used to describe various components. However, it is obvious that the components should not be defined by these terms. The terms are used only for distinguishing one component from another component. For example, a first component may be referred to as a second component and, likewise, a second component may also be referred to as a first component, without departing from the teaching of the inventive concept. When it is mentioned that a (first) component is "connected" to or "accessed" by another (second) component, it may be understood that the component is directly connected to or accessed by the other component or that still another (third) component is interposed between the two components.

In the present disclosure, the term "module" is intended to include a unit implemented in hardware, software, and firmware. For example, the term "module' may be interchangeably used with the terms "logic," "logical block," "part," and "circuit" in a mutually compatible manner. A module may be an integrated part, a smallest unit performing one or more functions, or a part of the unit. For example, a module may be implemented as an application-specific integrated circuit (ASIC).

The various embodiments of the present disclosure may be implemented in the form of a software program (e.g., program 140) including instructions stored in a machine-readable (e.g., computer-readable) storage medium (e.g., internal memory 136 and external memory 138). The machine may be a device that is capable of calling out and executing an instruction from the storage medium to perform an operation, and examples of the machine may include the electronic devices disclosed in the embodiments (e.g., electronic device 101). If the instruction is executed by a processor (e.g., processor 120), the processor may execute a corresponding function autonomously or control other components to execute the corresponding function. The instruction may include a code generated or executed by a compiler or an interpreter. The machine-readable storage medium may be a non-transitory storage medium. As used herein, the expression "non-transitory" is used to intend that the storage medium includes no signal and is tangible regardless of whether data are stored in the storage medium semi-persistently or temporarily.

A method according to any of various embodiments of the present disclosure may be provided in the form of a computer program product. The computer program product may be traded between a seller and a buyer. The computer program product may be distributed on a machine-readable storage medium (e.g., compact disc read only memory (CD-ROM)) or through an application store (e.g., Play Store). In the case of the on-line distribution, at least part of the computer program product may be temporarily stored or instantly generated in a storage medium such as a memory of a manufacturer's server, an application store server, or a relay server.

The components (e.g., module and program) according to various embodiments of the present disclosure may include at least one of the aforementioned components with omission of some components or addition of other components. Alternatively or additionally, the components (e.g., module and program) may be selectively combined into an entity to perform the functions of the components equally as before the combination or in similar manners. The operations of the modules, programming modules, or other components according to various embodiments of the present disclosure may be executed in series, in parallel, recursively, or heuristically; also, some operations may be executed in different order, omitted, or extended with other operations.

Figure 3:
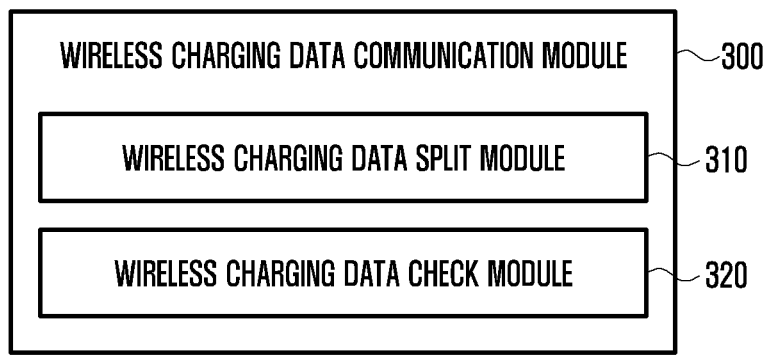
FIG. 3 is a block diagram illustrating a configuration of a wireless charging data communication module according to various embodiments of the present disclosure.

FIG. 3 is a block diagram illustrating a configuration of a wireless charging data communication module according to various embodiments of the present disclosure.

According to various embodiments of the present disclosure, the electronic device 101 (e.g., portable terminal and charging pad) may include a wireless charging data communication module 300 (e.g., wireless charging module 197) as shown in FIG. 3. The electronic device 101 may transmit and receive at least one piece of data to and from the external electronic device 102 by means of the wireless charging data communication module 300. For example, if the electronic device 101 is a PRX such as a portable terminal, the external electronic device 102 may be a PTX such as a wireless charging pad; if the electronic device 101 is a PTX such as a wireless charging pad, the external electronic device 102 may be a PRX such as a portable terminal.

According to various embodiments of the present disclosure, the electronic device 101 may transmit and receive data for authenticating a wireless charging mode (hereinafter, referred to as authentication data) to and from the external electronic device 102 by means of the wireless charging data communication module 300. For example, there is a need of an authentication procedure for authenticating the electronic device 101 and/or the external electronic device 102 for a wireless charging operation between the electronic device 101 and the external electronic device 102. If there is no authentication between the electronic device 101 and the external electronic device 102, the battery 189 is likely to be overcharged or undercharged so as to cause battery damage or user inconvenience.

According to various embodiments of the present disclosure, the electronic device 101 may transmit or receive at least one piece of authentication data for authenticating a wireless charging mode. However, because the data communication for wireless charging mode is limited to a data rate of 2 kbps, it is difficult to transmit a large amount of authenticating data efficiently in a short time.

According to various embodiments of the present disclosure, the electronic device 101 may split the authentication data into at least one packet by means of a wireless charging data split module 310. For example, the electronic device 101 may attach a tag to the split authentication data to indicate the start, stop, or order of data communication for wireless charging. This makes it possible to transmit a large amount of authentication data to the external electronic device 102 more effectively. Descriptions are made later of the exemplary structures of a split authentication data packet with reference to FIGS. 4A, 4B, 5, and 6.

According to various embodiments of the present disclosure, the electronic device 101 may reassemble the split authentication data into the original authentication data by means of a wireless charging data check module 320. For example, the split authentication data may include a unique tag, and the electronic device 101 may acquire information on at least one of a start, stop, and order of data transmission by referencing the tag and reassemble the original authentication data based on the acquired information.

According to various embodiments of the present disclosure, the electronic device 101 may check the split authentication data by means of the wireless charging data check module 320. For example, the electronic device may check the tag included in the split authentication data to determine whether at least one packet necessary for authentication is received completely. If there is a missing tag, the electronic device 101 may request for the packet identified by the missing tag to complete authentication.

Figure 4A:
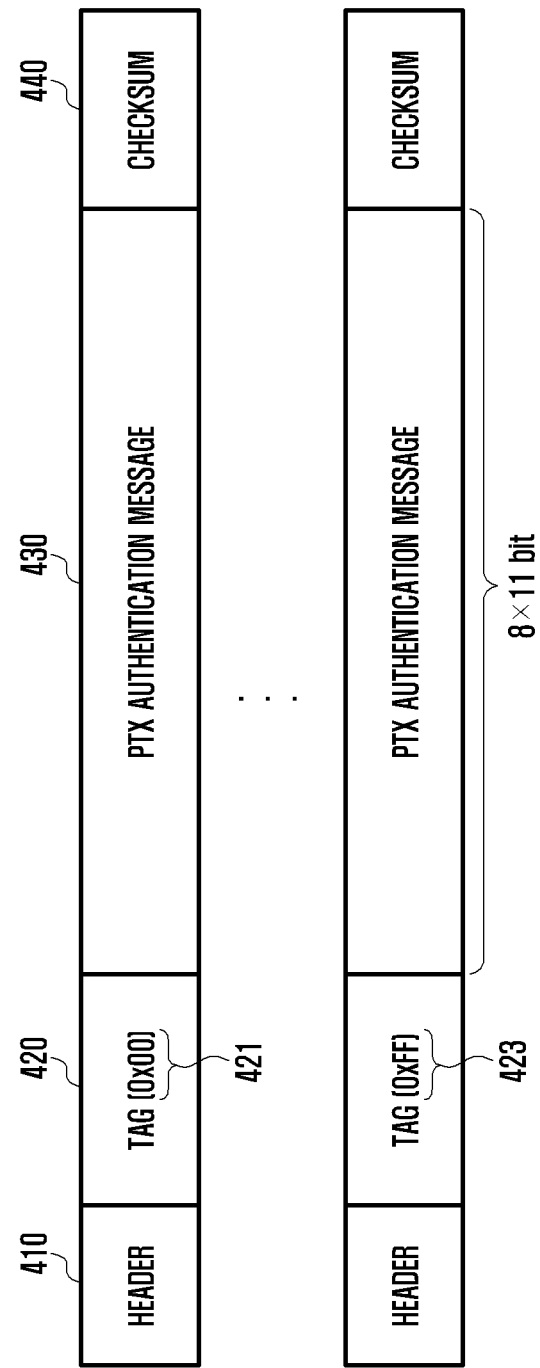
FIG. 4A is a diagram illustrating a structure of data split by a PTX according to various embodiments of the present disclosure.

FIG. 4A is a diagram illustrating a structure of data split by a PTX according to various embodiments of the present disclosure.

FIG. 4A shows a structure of data split by the PTX, e.g., packets of authentication data according to various embodiments of the present disclosure. The electronic device 101 may be a wireless charging pad and, in this case, it plays the role of the PTX.

According to various embodiments of the present disclosure, the authentication data packet generated by the PTX may include a header 410, a tag 420, a PTX authentication message 430, and a checksum 440. The authentication data packet generated by the PTX may further include authentication message length information.

According to various embodiments of the present disclosure, the electronic device 101 may set the tag 420 of the authentication data packet to a value in the range from 0x00 to 0xFF as denoted by reference numbers 421 and 423. For example, if the tag 420 is set to 0x00 as denoted by reference number 421, this tag 420 may be assumed as a start tag; thus, the corresponding packet may be determined as the initial packet carrying the authentication data. If the tag 420 is set to 0xFF as denoted by reference number 423, this tag may be assumed as the stop tag; thus, the corresponding packet may be determined as the last packet carrying the authentication data.

According to various embodiments of the present disclosure, the maximum size of a data packet that a PTX (e.g., wireless charging pad) can transmit to a PRX (e.g., portable terminal) at a time is 9 serial formats. Here, a serial format may mean the file format standardized for use between the PTX and PRX. For example, one serial format has a bitwidth of 11 bits including 1 start bit, 8 data bits, 1 parity bit, and 1 stop bit arranged in series. The electronic device 101 may assign 1 serial format for the tag 420 and 8 serial formats (8×11 bits) for a PTX authentication message 430 to generate a PTX authentication data packet. This aims to make it possible to transfer a large amount of authentication data effectively by mapping the authentication messages 430 obtained by splitting the authentication data to 8 serial formats along with a tag 420 mapped to 1 serial format by the authentication data packet. In this way, the electronic device 101 may transmit data N multiples (N is a natural number) the size of 8 serial formats so as to overcome the authentication data transfer amount limit of up to 9 serial formats for a wireless charging mode. That is, the present disclosure makes it possible to transmit authentication data in a split manner. As a consequence, it may be possible to secure authentication data transfer stability.

According to various embodiments of the present disclosure, the electronic device 101 may include the checksum 440 in the authentication data packet. The checksum 440 may be used to determine whether the individual packets carrying the authentication data are delivered successfully.

Figure 4B:
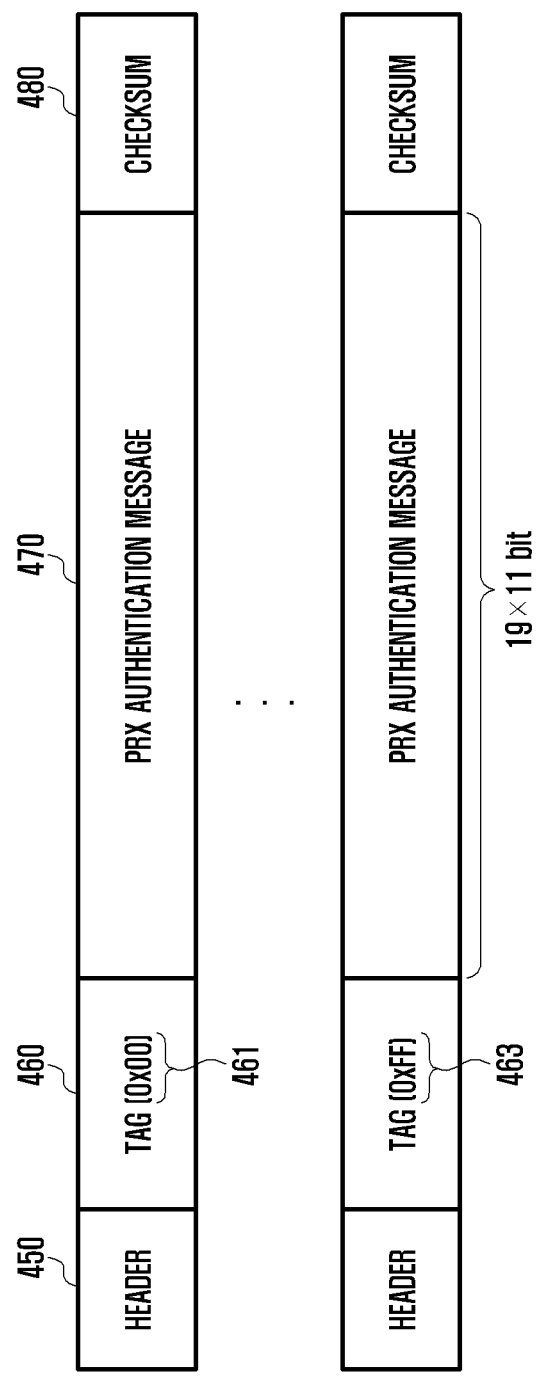
FIG. 4B is a diagram illustrating a structure of data split by a PRX according to various embodiments of the present disclosure.

FIG. 4B is a diagram illustrating a structure of data split by a PRX according to various embodiments of the present disclosure.

FIG. 4B shows a structure of data split by the PRX, e.g., packets of authentication data according to various embodiments of the present disclosure. The electronic device 101 may be a portable terminal and, in this case, plays the role of the PRX.

According to various embodiments of the present disclosure, the authentication data packet generated by the PRX may include a header 450, a tag 460, a PRX authentication message 470, and a checksum 480. The authentication data packet generated by the PRX may further include authentication message length information.

According to various embodiments of the present disclosure, the electronic device 101 may set the tag 460 of the authentication data packet to a value in the range from 0x00 to 0xFF as denoted by reference numbers 461 and 463. For example, if the tag 460 is set to 0x00 as denoted by reference number 461, this tag may be assumed as a start tag; thus, the corresponding packet may be determined as the first packet carrying the authentication data. If the tag 460 is set to 0xFF as denoted by reference number 463, this tag may be assumed as the stop tag; thus, the corresponding packet may be determined as the last packet carrying the authentication data.

According to various embodiments of the present disclosure, the maximum size of a data packet that the PRX (e.g., portable terminal) can transmit to the PTX (e.g., wireless charging pad) at a time is 20 serial formats. For example, one serial format has a bitwidth of 11 bits including 1 start bit, 8 data bits, 1 parity bit, and 1 stop bit arranged in series. The electronic device 101 may assign 1 serial format for the tag 460 and 19 serial formats (19×11 bits) for a PRX authentication message 470. This aims to make it possible to transfer a large amount of authentication data greater than 20 serial formats effectively by mapping the authentication messages 470 obtained by splitting authentication data to 19 serial formats along with a tag 460 mapped to 1 serial format by the authentication data packet. In this way, the electronic device 101 may transmit data N multiples (N is a natural number) the size of 19 serial formats so as to overcome the authentication data transfer amount limit of up to 20 serial formats for a wireless charging mode. That is, the present disclosure makes it possible to transmit authentication data in a split manner. As a consequence, it may be possible to secure authentication data transfer stability.

According to various embodiments of the present disclosure, the electronic device 101 may include the checksum 480 in the authentication data packet. The checksum 480 may be used to determine whether the individual packets carrying the authentication data are delivered successfully.

Figure 5:
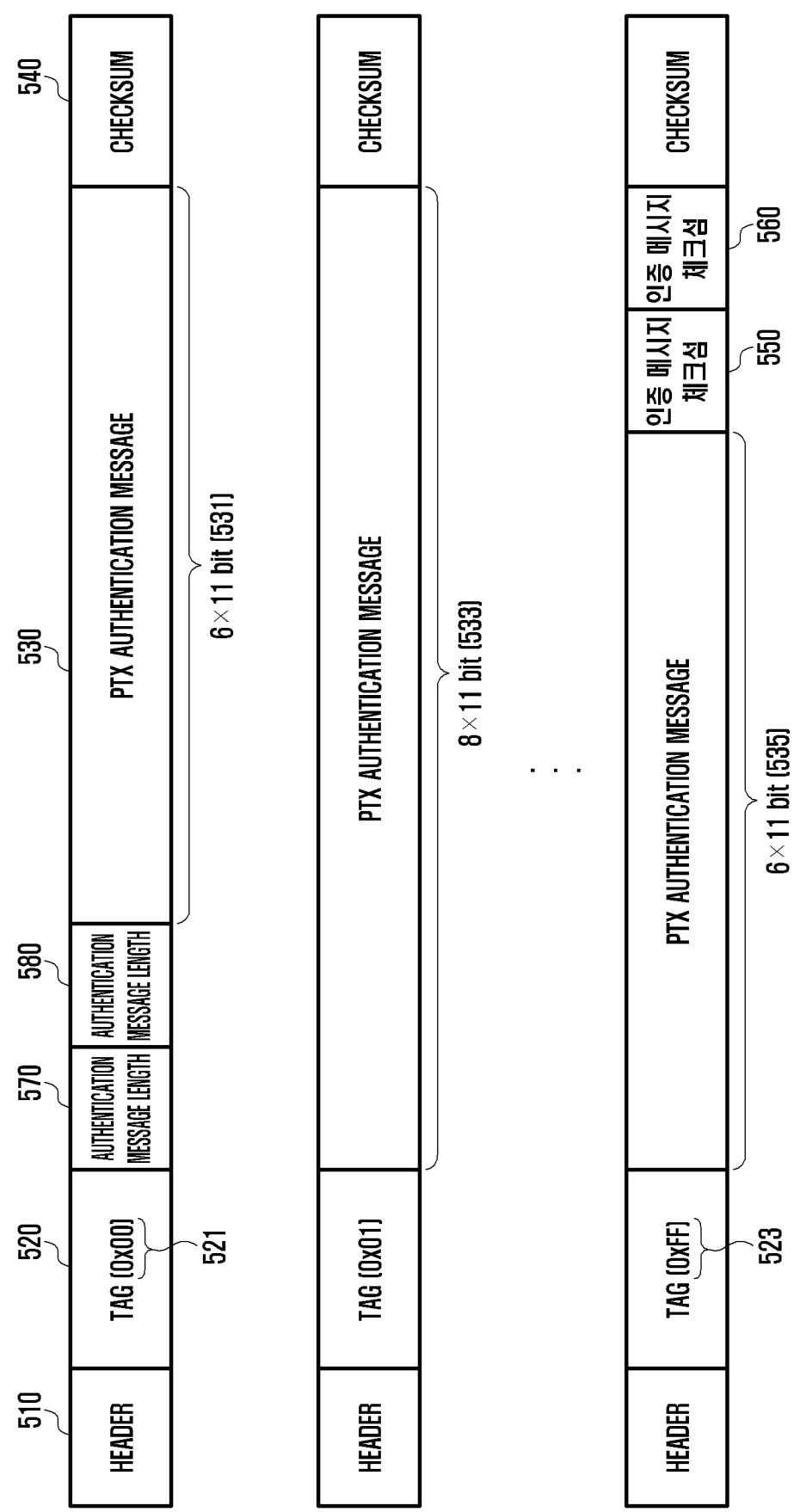
FIG. 5 is a diagram illustrating a structure of split data including a PTX authentication message according to various embodiments of the present disclosure.

FIG. 5 is a diagram illustrating a structure of split data including a PTX authentication message according to various embodiments of the present disclosure.

FIG. 5 shows a structure of data split by the PTX, e.g., packets of authentication data according to various embodiments of the present disclosure. The electronic device 101 may be a wireless charging pad and, in this case, play the role of the PTX.

According to various embodiments of the present disclosure, the authentication data packet generated by the PTX may include a header 510, a tag 520, a PTX authentication message 530, and a checksum 540. The authentication data packet generated by the PTX may further include authentication message length information. Unlike the embodiment of FIG. 4A, the first packet including a tag 520 set to a start tag value 0x00 as denoted by reference number 521 may further include authentication message length fields 570 and 580. For example, the authentication message length fields 570 and 580 may carry a higher authentication message length (Auth Msg Length (higher 11 bits)) and a lower authentication message length (Auth Msg Length (Lower 11 bits)), respectively. Meanwhile, the last packet including the tag 520 set to a stop tag value 0xFF as denoted by reference number 523 may further include authentication message checksum fields 550 and 560. For example, the authentication message checksum fields 550 and 560 may carry a higher authentication message checksum (Auth Msg Checksum (Higher 11 bits)) and a lower authentication message checksum (Auth Msg Checksum (Lower 11 bits)), respectively.

According to various embodiments of the present disclosure, the electronic device 101 may set the tag 520 of the authentication data packet to a value in the range from 0x00 to 0xFF as denoted by reference numbers 521 and 523. For example, if the tag 520 is set to 0x00 as denoted by reference number 521, this tag may be assumed as a start tag; thus, the corresponding packet may be determined as the first packet carrying the authentication data. If the tag 520 is set to 0xFF as denoted by reference number 523, this tag may be assumed as the stop tag; thus, the corresponding packet may be determined as the last packet carrying the authentication data.

According to various embodiments of the present disclosure, the maximum size of a data packet that a PTX (e.g., wireless charging pad) can transmit to a PRX (e.g., portable terminal) at a time is 9 serial formats. The electronic device 101 may assign 1 serial format for the tag 520 and 8 serial formats (8×11 bits) for a PTX authentication message 530 to generate a PTX authentication data packet. This aims to make it possible to transfer a large amount of authentication data greater than 9 serial formats effectively by mapping the authentication messages 530 obtained by splitting authentication data to 8 serial formats along with a tag 520 mapped to 1 serial format by the authentication data packet.

As shown in FIG. 5, the last packet is identified by the tag 520 set to 0xFF as denoted by reference number 523 and includes 6 serial formats for the PTX authentication message as denoted by reference number 535 and 2 serial formats for the authentication message checksums 550 and 560.

In this way, the electronic device 101 may transmit data N multiples (N is a natural number) the size of 8 serial formats so as to overcome the authentication data transfer amount limit of up to 9 serial formats for a wireless charging mode. That is, the present disclosure makes it possible to transmit authentication data in a split manner. As a consequence, it may be possible to secure authentication data transfer stability.

According to various embodiments of the present disclosure, the electronic device 101 may include the checksum 540 in the authentication data packet. The checksum 540 may be used to determine whether the individual packets carrying the authentication data are delivered successfully.

According to various embodiments of the present disclosure, the authentication message checksums 550 and 560 may be used to determine whether the PTX authentication message is erroneous. For example, the electronic device 101 may perform a test on the checksum to guarantee integrity of the PTX authentication message. Through this, it is possible to improve the reliability of the data carried in the authentication message in comparison with an individual packet checksum test.

Figure 6:
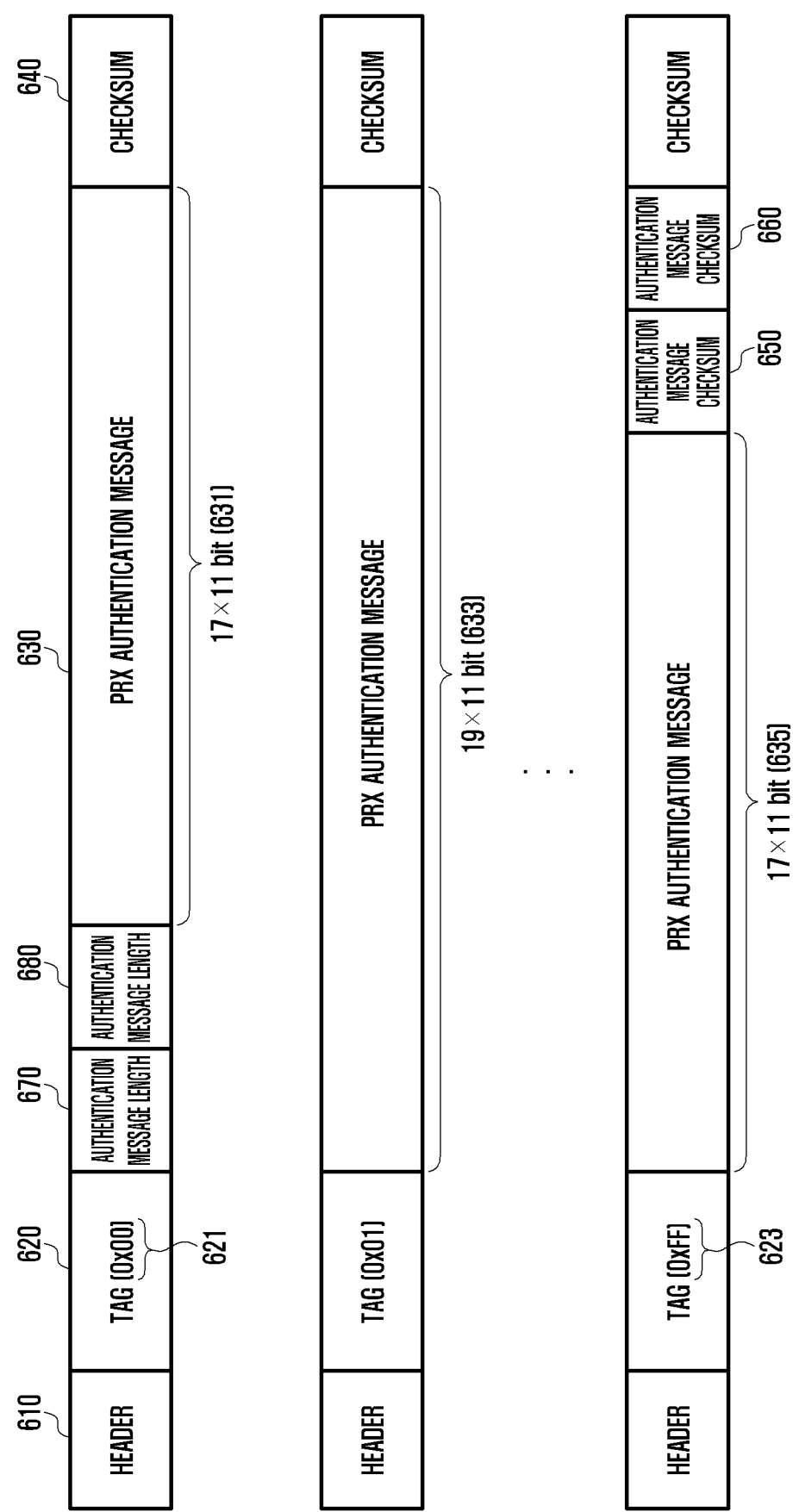
FIG. 6 is a diagram illustrating a structure of split data including a PRX authentication message according to various embodiments of the present disclosure.

FIG. 6 is a diagram illustrating a structure of split data including a PRX authentication message according to various embodiments of the present disclosure.

FIG. 6 shows a structure of data split by the PRX, e.g., packets of authentication data according to various embodiments of the present disclosure. The electronic device 101 may be a portable terminal and, in this case, play the role of the PRX.

According to various embodiments of the present disclosure, the authentication data packet generated by the PRX may include a header 610, a tag 620, a PRX authentication message 630, and a checksum 640. The authentication data packet generated by the PRX may further include authentication message length information. Unlike the embodiment of FIG. 4B, the first packet including a tag 620 set to a start tag value 0x00 as denoted by reference number 621 may further include authentication message length fields 670 and 680. For example, the authentication message length fields 670 and 680 may carry a higher authentication message length (Auth Msg Length (higher 11 bits)) and a lower authentication message length (Auth Msg Length (Lower 11 bits)), respectively. Meanwhile, the last packet including the tag 620 set to a stop tag value 0xFF as denoted by reference number 623 may further include authentication message checksum fields 650 and 660. For example, the authentication message checksum fields 650 and 660 may carry a higher authentication message checksum (Auth Msg Checksum (Higher 11 bits)) and a lower authentication message checksum (Auth Msg Checksum (Lower 11 bits)), respectively.

According to various embodiments of the present disclosure, the electronic device 101 may set the tag 620 of the authentication data packet to a value in the range from 0x00 to 0xFF as denoted by reference numbers 621 and 623. For example, if the tag 620 is set to 0x00 as denoted by reference number 621, this tag may be assumed as a start tag; thus, the corresponding packet may be determined as the first packet carrying the authentication data. If the tag 620 is set to 0xFF as denoted by reference number 623, this tag may be assumed as the stop tag; thus, the corresponding packet may be determined as the last packet carrying the authentication data.

According to various embodiments of the present disclosure, the maximum size of a data packet that a PRX (e.g., portable terminal) can transmit to a PTX (e.g., wireless charging pad) at a time is 20 serial formats. For example, one serial format has a bitwidth of 11 bits including 1 start bit, 8 data bits, 1 parity bit, and 1 stop bit arranged in series. The electronic device 101 may assign 1 serial format for the tag 620 and 19 serial formats (19×11 bits) for a PRX authentication message 630 to generate a PRX authentication data packet. This aims to make it possible to transfer a large amount of authentication data greater than 20 serial formats effectively by mapping the authentication messages 630 obtained by splitting the authentication data to 19 serial formats along with a tag 620 mapped to 1 serial format by the authentication data packet.

As shown in FIG. 6, the last packet is identified by the tag 620 set to 0xFF as denoted by reference number 623 and includes 17 serial formats for the PRX authentication message as denoted by reference number 635 and 2 serial formats for the authentication message checksums 650 and 660.

In this way, the electronic device 101 may transmit data N multiples (N is a natural number) the size of 8 serial formats so as to overcome the authentication data transfer amount limit of up to 9 serial formats for a wireless charging mode. That is, the present disclosure makes it possible to transmit authentication data in a split manner. As a consequence, it may be possible to secure authentication data transfer stability.

According to various embodiments of the present disclosure, the electronic device 101 may include the checksum 640 in the authentication data packet. The checksum 640 may be used to determine whether the individual packets carrying the authentication data are delivered successfully.

According to various embodiments of the present disclosure, the authentication message checksums 650 and 660 may be used to determine whether the PRX authentication message is erroneous. For example, the electronic device 101 may perform a test on the checksum to guarantee integrity of the PRX authentication message.

According to various embodiments of the present disclosure, the electronic device 101 is capable of performing a checksum test on the authentication message checksum 660 (least significant bit (LSB)) included in the last packet carrying the authentication data to determine whether the transmitted/received PRX authentication data is erroneous. For example, the electronic device 101 may perform the checksum test on the LSB of the PRX authentication message for an authentication data integrity test. Through this, it is possible to improve the reliability of the data carried in the authentication message in comparison with an individual packet checksum test.

Figure 7:
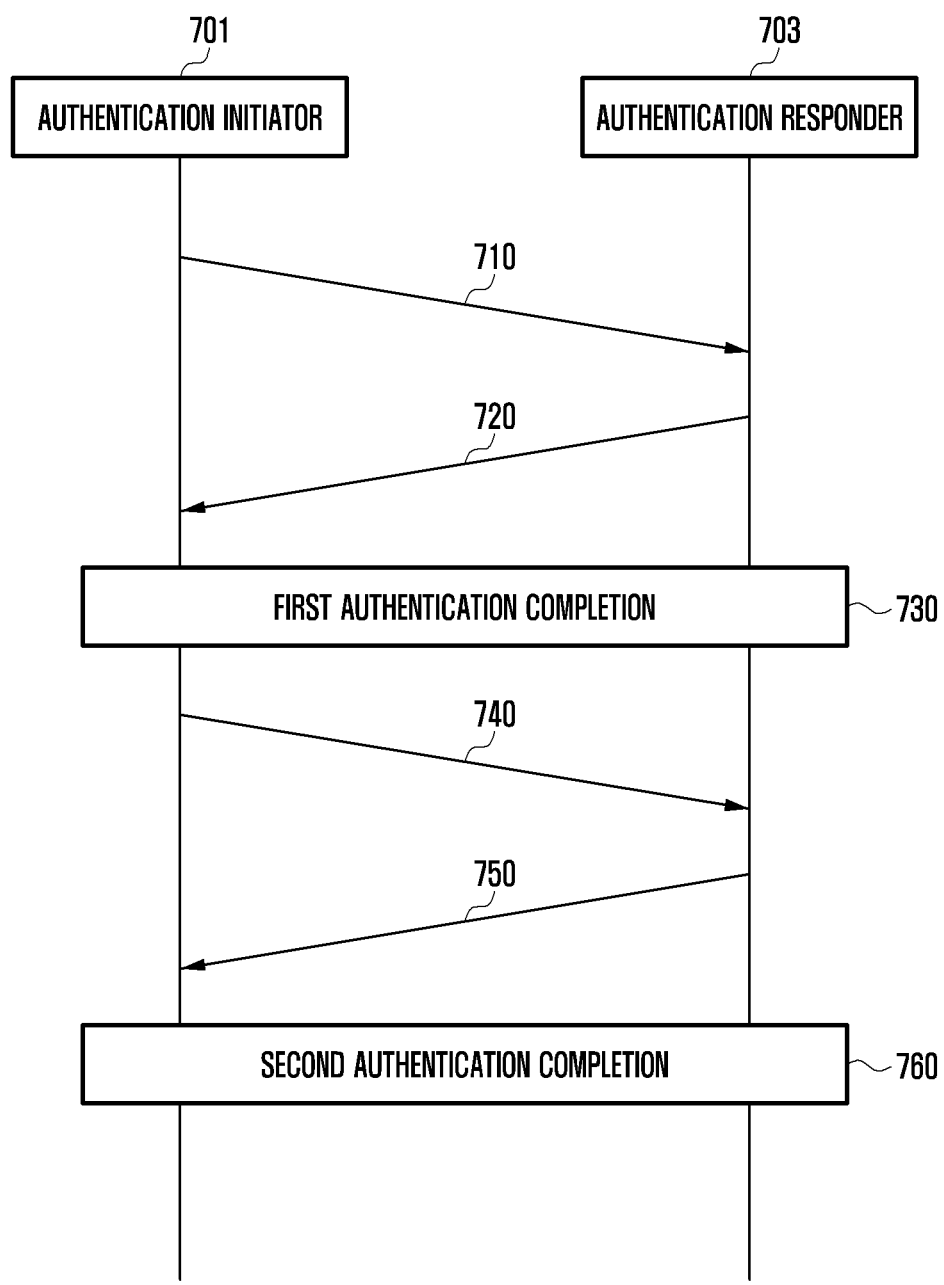
FIG. 7 is a signal flow diagram illustrating a procedure for authenticating an electronic device according to various embodiments of the present disclosure.

FIG. 7 is a signal flow diagram illustrating a procedure for authenticating an electronic device according to various embodiments of the present disclosure.

FIG. 7 depicts a procedure of exchanging authentication data between an authentication initiator 701 and an authentication responder 703 according to various embodiments of the present disclosure. Typically, the electronic device 101, such as a portable terminal, is likely to be the authentication initiator 701 and the external device 102, such as a wireless charging pad, is likely to be the authentication responder 703. Of course, the reverse is exceptionally possible. That is, the electronic device 101, such as the portable terminal, may become the authentication responder 703 while the external electronic device, such as the wireless charging pad, may become the authentication initiator 701. Here, the description is directed to an exemplary case where the electronic device 101, such as the portable terminal, is the authentication initiator 701 while the external electronic device 102, such as the wireless charging pad, is the authentication responder 703.

According to various embodiments of the present disclosure, the authentication initiator 701 may make a first authentication request to the authentication responder 703 at step 710. For example, the authentication initiator 701 may request to the authentication responder 703 for a certificate chain. The certificate chain may include public authentication message information corresponding to a root organization providing an authentication security system (e.g., wireless power consortium (WPC)), a manufacturer authorized by the root organization (e.g., acme), and an individual product (e.g., wireless charging pad). The public authentication message is uniquely paired with a private authentication message through encryption via an authentication security system. That is, the certificate chain may be included in the information on three types of public authentication messages. The certificate chain may be paired with three types of private authentication messages corresponding to the public authentication message. In this respect, there is a need of a method for transmitting such a large amount of certification chain data that is required for wireless charging authentication in a split manner.

According to various embodiments of the present disclosure, the authentication responder 703 may send, at step 720, the authentication initiator 701 a certificate chain in response to the first authentication request. For example, the authentication responder 703 may split the certificate chain information into wireless charging authentication data and transmit the data with start and stop tags.

According to various embodiments of the present disclosure, the authentication initiator 701 may verify validity of the received certificate chain at step 730. For example, if the certificate chain is valid, the authentication initiator 701 may be supplied power (e.g., low power) from the authentication responder 703. Through this, the authentication initiator 701 may enter a normal charging mode. Meanwhile, the authentication initiator 701 may further make a second authentication request to the authentication responder 703 for fast charging.

According to various embodiments of the present disclosure, if the first authentication is completed, the authentication initiator 701 may make the second authentication request to the authentication responder 703 at step 740. The authentication initiator 701 may send an authentication challenge for wireless charging authentication to the authentication responder 703. In this way, the authentication initiator 701 may request to the authentication responder 703 for change of the wireless charging mode.

According to various embodiments of the present disclosure, the authentication responder 703 may send, at step 750, the authentication initiator 701 an authentication message corresponding to the authentication challenge in response to the second authentication request.

According to various embodiments of the present disclosure, the authentication initiator 701 may verify validity of the received authentication message at step 760. For example, if the authentication message is valid, the authentication initiator 701 may be supplied power (e.g., high power) from the authentication responder 703. Through this, the authentication initiator 701 may enter a fast charging mode.

Figure 8:
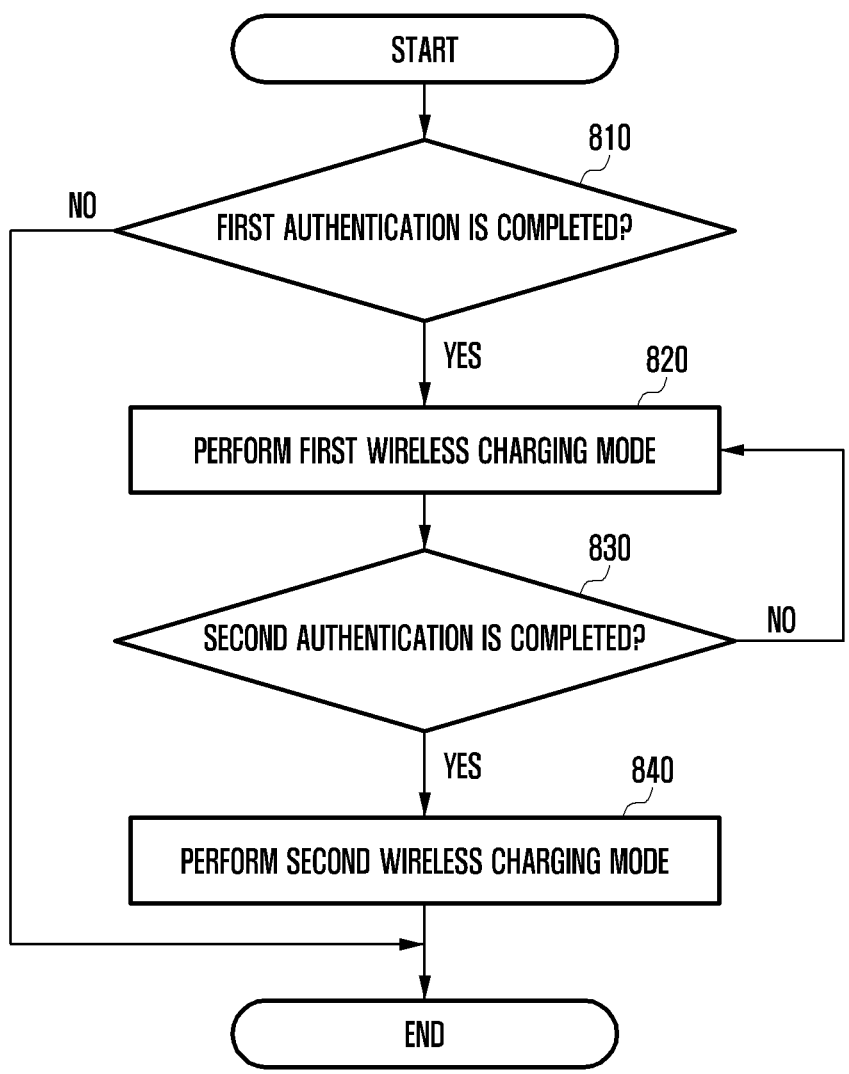
FIG. 8 is a flowchart illustrating a method for activating power charging modes in a stepwise manner in accordance with an authentication level of an electronic device according to an example embodiment of the present disclosure.

FIG. 8 is a flowchart illustrating a method for activating power charging modes in a stepwise manner in accordance with an authentication level of an electronic device according to an example embodiment of the present disclosure.

According to various embodiments of the present disclosure, the electronic device 101 (e.g., portable terminal) or the external electronic device 102 (e.g., wireless charging pad) may determine at step 810 whether a first authentication for wireless charging succeeds. That is, the electronic device 101 or the external electronic device 102 may initiate a first authentication in a low power mode (e.g., second period 920 in FIG. 9).

According to various embodiments of the present disclosure, the electronic device 101 may request to the external electronic device 102 for a certificate chain. The certificate chain may include public authentication message information corresponding to a root organization providing an authentication security system (e.g., wireless power consortium (WPC)), a manufacturer authorized by the root organization (e.g., acme), and an individual product (e.g., wireless charging pad). Each public authentication message is uniquely paired with a private authentication message through encryption via an authentication security system. The private authentication message may be used in a procedure of encrypting and decrypting message data between paired electronic devices (e.g., pair of PTX and PRX) targeted for authentication. The certificate chain may be paired with three types of private authentication messages corresponding to the public authentication message. In this respect, there is a need of a method for transmitting such a large amount of certification chain data that is required for wireless charging authentication in a split manner. For example, the electronic device 101 may perform a first authentication based on the split data of the certificate chain received from the external electronic device 102.

According to various embodiments of the present disclosure, if the first authentication succeeds for wireless charging at step 810, the electronic device 101 (e.g., portable terminal) or the external electronic device 102 (e.g., wireless charging pad) may enter a first wireless charging mode (e.g., normal charging mode) at step 820.

According to various embodiments of the present disclosure, if the certificate chain is valid, the electronic device 101 may be supplied a first power (e.g., normal charging power) from the external electronic device 102. That is, the electronic device 101 may enter the normal charging mode. Afterward, the electronic device 101 may further make a second authentication request to the external electronic device 102 for fast charging.

According to various embodiments of the present disclosure, the electronic device 101 (e.g., portable terminal) or the external electronic device 102 (e.g., wireless charging pad) may determine at step 830 whether a second authentication succeeds for wireless charging during the first wireless charging mode.

According to various embodiments of the present disclosure, if the first authentication succeeds, the first electronic device 101 may request to the external electronic device 102 for second authentication. The electronic device 101 may send the external electronic device an authentication challenge for wireless charging authentication. The external electronic device 102 may send the electronic device 101 an authentication message corresponding to the authentication challenge in response to the second authentication request. The electronic device 101 may verify validity of the received authentication message to perform the second authentication.

According to various embodiments of the present disclosure, if the second authentication succeeds for wireless charging at step 830, the electronic device 101 (e.g., portable terminal) or the external electronic device 102 (e.g., wireless charging pad) may enter the second wireless charging mode (e.g., fast charging mode) at step 840.

According to various embodiments of the present disclosure, if the authentication message is valid, the electronic device 101 may be supplied a second power (e.g., fast charging power) from the external electronic device 102. That is, the electronic device 101 may enter the fast charging mode.

According to various embodiments of the present disclosure, if the second authentication fails for wireless charging at step 830, the procedure returns to step 820 such that the electronic device 101 (e.g., portable terminal) or the external electronic device 102 (e.g., wireless charging pad) continues operating in the first wireless charging mode (e.g., normal charging mode).

According to various embodiments of the present disclosure, if the authentication message is not valid at step 830, the electronic device 101 may be supplied the first power (e.g., normal charging power) from the external device 102. That is, the electronic device 101 may continue operating in the normal charging mode.

Figure 9:
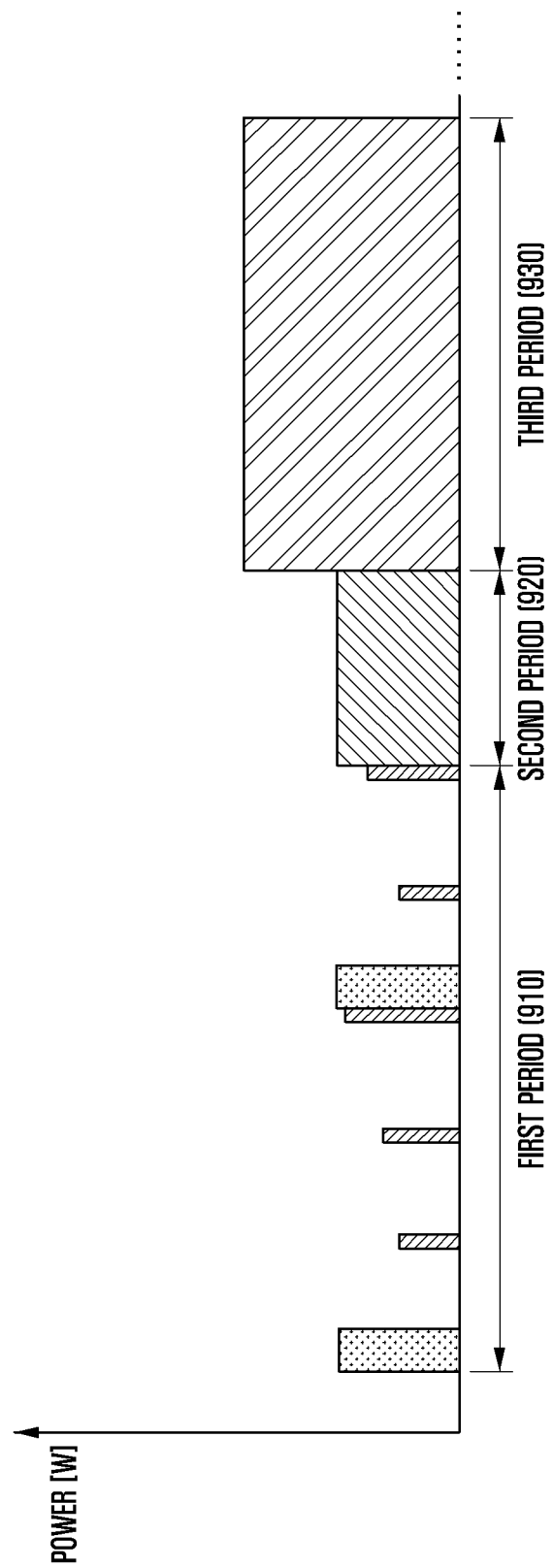
FIG. 9 is a graph illustrating time periods for wireless charging of an electronic device according to various embodiments of the present disclosure.

Although the embodiment of FIG. 8 is directed to a case where the second authentication for fast charging is initiated during the first wireless charging mode, the second authentication for the fast charging may be initiated in a low power mode (e.g., second period 920 in FIG. 9). That is, the electronic device 101 and the external electronic device 102 operating in the low power mode may enter the second wireless charging mode immediately without entering the first wireless charging mode.

FIG. 9 is a graph illustrating time periods for wireless charging of an electronic device according to various embodiments of the present disclosure.

In reference to FIG. 9, a PRX (e.g., portable terminal) may receive a ping (e.g., analog ping and digital ping) signal transmitted by a PTX (e.g., wireless charging pad) during a first period 910 according to various embodiments of the present disclosure. For example, the PRX may be operating in a power saving mode, without being wirelessly charged, during the first period 910.

According to various embodiments of the present disclosure, a PRX may detect a PTX during a second period 920. The PRX and PTX may exchange inter-device authentication data. For example, the second period 920 may be a time duration for a first authentication as described with reference to FIG. 7 (steps 710 and 720). The PRX and PTX may exchange public authentication messages during the second period 920. For example, the PTX may output a predetermined power and the PRX may receive the predetermined power from the PTX during the second period 920. The PRX and/or PTX may operate in a low power mode during the second period 920 because the predetermined power level during the second period is lower than that during the third period 930 after authentication succeeds (e.g., after completion of the first authentication or both the first and second authentication).

According to various embodiments of the present disclosure, the PRX and PTX may complete a charging mode configuration communication (e.g., authentication for charging mode configuration) during the third period 930 and perform wireless charging operations normally in the configured charging mode (e.g., first wireless charging mode or second charging mode in FIG. 8. For example, the PRX and/or PTX may operate in the first wireless charging mode (e.g., normal charging mode) or the second charging mode (e.g., fast charging mode). For reference, the second authentication operations (steps 740 and 750) of FIG. 7 may be performed during the second period 920 or the third period 930.

Although the embodiment of FIG. 9 is directed to a case where the power level is regular during the third period 930, the power level may change according to the configured charging mode because both the first and second wireless charging modes are possible during the third period 930. For example, because the second wireless charging mode is the fast charging mode, the wireless charging power level in the second wireless charging mode is likely to be higher than that in the first wireless charging mode. Also, because the first wireless charging mode is the normal charging mode, the wireless charging power level in the first wireless charging mode is likely to be lower than that in the second wireless charging mode.

According to various embodiments of the present disclosure, an electronic device for performing authentication for wirelessly receiving power supplied from an external electronic device may include a wireless charging receiver module including wireless charging receiver circuitry, and a processor configured to control the wireless charging receiver module to exchange authentication data with the external electronic device and receive the wireless power supplied from the external electronic device based on a result of the authentication, the authentication data being split into at least one packet.

The at least one packet may include at least one of a header, a tag, a power transmitter authentication message, a power receiver authentication message, authentication message length information and a checksum.

The tag may be an order tag indicating packet order of the authentication data.

The at least one packet may further include, if the at least one packet comprises a stop tag, an authentication message checksum.

The at least one packet may further include, if the at least one packet is generated by the external electronic device, the power receiver authentication message and, if the at least one packet is generated by the electronic device, the power transmitter authentication message.

The at least one packet may further include, if the at least one packet comprises a start tag, at least one of the authentication message length information and a part of the authentication message.

The authentication may be a Qi standard authentication.

The wireless charging receiver module may be configured to exchange the data in a magnetic induction manner.

The authentication may include a first authentication and a second authentication, and the processor is configured to control the electronic device to operate in a first wireless charging mode based on a result of the first authentication and in a second wireless charging mode based on a result of the second authentication, the second wireless charging mode supporting a charging speed faster than a charging speed of the first wireless charging mode.

According to various embodiments of the present disclosure, an electronic device performing authentication for wirelessly supplying power to an external electronic device may include a wireless charging transmitter module including wireless charging transmitter circuitry, and a processor configured to control the wireless charging transmitter module to exchange standard authentication data with the external electronic device and wirelessly supply power to the external electronic device based on a result of the authentication, the authentication data being split into at least one packet.

The at least one packet may include, if the at least one packet is generated by the external electronic device, a power receiver authentication message and, if the at least one packet is generated by the electronic device, a power transmitter authentication message.

The at least one packet includes, if the at least one packet may include a start tag, at least one of authentication message length information and a part of an authentication message.

According to various embodiments of the present disclosure, an electronic device for wirelessly receiving power from an external electronic device may include a wireless charging receiver module including wireless charging receiver circuitry, and a processor configured to control the wireless charging receiver module to exchange first data for authentication with the external electronic device and encrypted second data for authentication with the external electronic device and receive the power supplied by the external electronic device.

The processor may be configured to control the wireless charging receiver module to receive the first and second data in a low power reception mode. Here, the first data may mean the data being exchange at steps 710 and 720 of FIG. 7, and the second data may mean the data being exchanged at steps 740 and 750 of FIG. 7.

The second data may include a unique identity information (ID) or charging configuration information.

The second data may be data for increasing or decreasing charging power from the external electronic device.

The processor may be configured to control the wireless charging receiver module to transmit third data to the external electronic device in a power reception mode to request for increasing or decreasing charging power from the external electronic device.

The first data may be data for decoding the third data.

The processor may be configured to control the wireless charging receiver module to transmit the third data to the external electronic device using the first data, and the first, second, and third data are data split into at least one packet.

According to various embodiments of the present disclosure, an electronic device for wirelessly supplying power to an external electronic device may include a wireless charging transmitter module including wireless charging transmitter circuitry and a processor configured to control the wireless charging transmitter module to perform communication with the external electronic device for exchange of first data and encrypted second data for authentication and supply of the power to the external electronic device.

As described above, the present disclosure is advantageous in terms of facilitating wireless charging by performing wireless charging in a charging mode being supported by an authenticated PRX. This makes it possible to protect against battery damage caused overcharge and accelerate wireless charging.

The present disclosure is advantageous in terms that an electronic device (e.g., portable terminal and charging pad) is capable of segmenting wireless charging-related data. For example, the electronic device may attach a tag to the wireless charging-related data to indicate start and stop of the data communication for wireless charging. Also, the present disclosure is advantageous in terms of adding tags to assign sequence numbers to the segmented data. The electronic device may inspect whether all data for use in authentication are received. If there is a missing tag, the electronic device may request for the data corresponding to the missing tag to continue the authentication procedure.

Also, the present disclosure is advantageous in terms of facilitating an authentication procedure for wireless charging in such a way of segmenting data for authentication in the size fit for the restricted bandwidth for a wireless charging mode. The electronic device may divide a charging round into multiple charging periods with different wireless charging modes and perform charging mode-specific authentication to supply charging power at charging mode-specific power levels.

What is claimed is:

1. An electronic device for performing authentication for wirelessly receiving power supplied from an external electronic device, the electronic device comprising:
a wireless charging receiver module including wireless charging receiver circuitry; and
a processor configured to:
control the wireless charging receiver module to exchange first authentication data with the external electronic device for authentication with the external electronic device, the first authentication data exchange including receiving authentication data split into a plurality of packets from the external electronic device and transmitting authentication data split into a plurality of packets, wherein each of the plurality of transmitted packets includes a respective tag including information indicating packet order of the authentication data split into the plurality of transmitted packets;
perform authentication based on the received authentication data split into the plurality of packets;
receive wirelessly the power supplied from the external electronic device based on a result of the authentication using the first authentication data;
control the wireless charging receiver module to exchange, with the external electronic device, encrypted second data for authentication with the external electronic device; and
receive wirelessly the power supplied from the external electronic device based on a result of the authentication using the encrypted second data.

2. The electronic device of claim 1, wherein each of the plurality of transmitted packets comprises at least one of a header, a power receiver authentication message, authentication message length information, and a checksum.

3. The electronic device of claim 1, wherein the processor is further configured to reassemble the authentication data split into the plurality of packets, wherein the authentication is performed based on the reassembled authentication data.

4. The electronic device of claim 1, wherein each of the plurality of transmitted packets further comprises a stop tag, and an authentication message checksum.

5. The electronic device of claim 1, wherein each of the plurality of received packets is generated by the external electronic device and includes a power transmitter authentication message, and each of the plurality of transmitted packets generated by the electronic device and includes a power receiver authentication message.

6. The electronic device of claim 1, wherein each of the transmitted packets includes a start tag, at least one of authentication message length information and a part of the authentication message.

7. The electronic device of claim 1, wherein the authentication is a Qi standard authentication.

8. The electronic device of claim 1, wherein the wireless charging receiver module is configured to exchange the first authentication data via magnetic induction.

9. The electronic device of claim 1, wherein the authentication comprises a first authentication based on the first authentication data and a second authentication based on the encrypted second data, and the processor is configured to control the electronic device to operate in a first wireless charging mode based on a result of the first authentication and in a second wireless charging mode based on a result of the second authentication, the second wireless charging mode supporting a charging speed faster than a charging speed of the first wireless charging mode.

10. An electronic device for performing authentication for wirelessly supplying power to an external electronic device, the electronic device comprising:
a wireless charging transmitter module including wireless charging transmitter circuitry; and
a processor configured to:
control the wireless charging transmitter module to exchange first authentication data with the external electronic device for authentication with the external electronic device, the first authentication data exchange including receiving authentication data split into a plurality of packets from the external electronic device and transmitting authentication data split into a plurality of packets, wherein each of the plurality of transmitted packets includes a respective tag including information indicating packet order of the authentication data split into the plurality of transmitted packets;
perform authentication based on the received authentication data split into the plurality of packets;
wirelessly supply the power to the external electronic device based on a result of the authentication using the first authentication data;
control the wireless charging transmitter module to exchange encrypted second data; and
wirelessly supply the power to the external electronic device based on a result of the authentication using the second data.

11. The electronic device of claim 10, wherein each of the plurality of received packets is generated by the external electronic device and includes a power receiver authentication message, and wherein each of the plurality of transmitted packets is generated by the electronic device and includes a power transmitter authentication message.

12. The electronic device of claim 10, wherein the tag comprises a start tag, and each of the plurality of received packets includes at least one of authentication message length information and a part of an authentication message.

13. The electronic device of claim 1, wherein the processor is configured to control the wireless charging receiver module to receive the first and second data in a low power reception mode.

14. The electronic device of claim 1, wherein the second data comprises at least one of a unique identity information (ID) and charging configuration information of the external electronic device.

15. The electronic device of claim 1, wherein the second data is data for increasing or decreasing charging power from the external electronic device.

16. The electronic device of claim 1, wherein the processor is configured to control the wireless charging receiver module to transmit third data to the external electronic device in a power reception mode to request for at least one of increasing and decreasing charging power from the external electronic device.

17. The electronic device of claim 16, wherein the first data is data for decoding the third data.

18. The electronic device of claim 16, wherein the processor is configured to control the wireless charging receiver module to transmit the third data to the external electronic device using the first data, and the first, second, and third data are each data split into at least one packet.

19. A method for operating an electronic device comprising a wireless charging receiver module including wireless charging receiver circuitry, the method comprising:
- controlling the wireless charging receiver module to exchange first authentication data with an external electronic device for authentication with the external electronic device, the authentication data exchange including receiving authentication data split into a plurality of packets from the external electronic device and transmitting authentication data split into a plurality of packets, wherein each of the plurality of transmitted packets includes a respective tag including information indicating packet order of the authentication data split into the plurality of transmitted packets;
- performing the authentication based on the received authentication data split into the plurality of packets;
- receiving wireless power supplied from the external electronic device based on a result of the authentication using the first authentication data;
- controlling the wireless charging receiver module to exchange, with the external electronic device, encrypted second data for authentication with the external electronic device; and
- receiving wireless power supplied from the external electronic device based on a result of the authentication using the encrypted second data.

20. A method for operating an electronic device comprising a wireless charging transmitter module including wireless charging transmitter circuitry, the method comprising:
- controlling the wireless charging transmitter module to exchange first authentication data with an external electronic device for authentication with the external electronic device, the first authentication data exchange including receiving authentication data split into a plurality of packets from the external electronic device and transmitting authentication data split into a plurality of packets, wherein each of the plurality of transmitted packets includes a respective tag including information indicating packet order of the authentication data split into the plurality of transmitted packets;
- performing authentication based on the received authentication data split into the plurality of packets;
- wirelessly supplying power to the external electronic device based on a result of the authentication using the first authentication data;
- controlling the wireless charging transmitter module to exchange encrypted second data; and
- wirelessly supplying power to the external electronic device based on a result of the authentication using the second data.

* * * * *